J. WILLISON.
AUTOMATIC CAR COUPLING.
APPLICATION FILED DEC. 31, 1913. RENEWED AUG. 10, 1916.
1,201,668.
Patented Oct. 17, 1916.
2 SHEETS—SHEET 1.
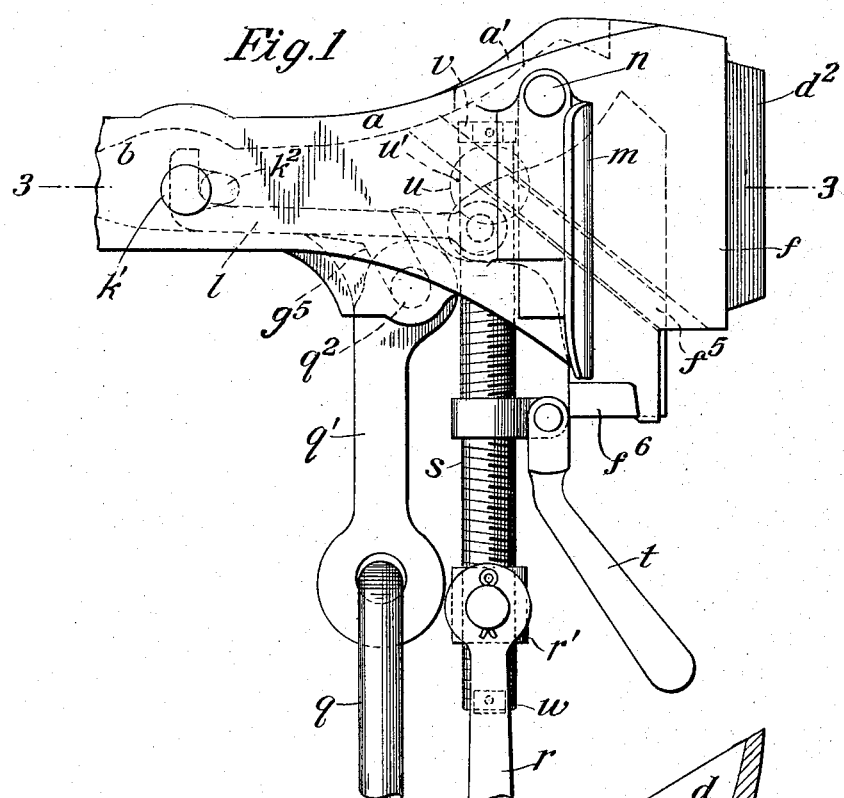
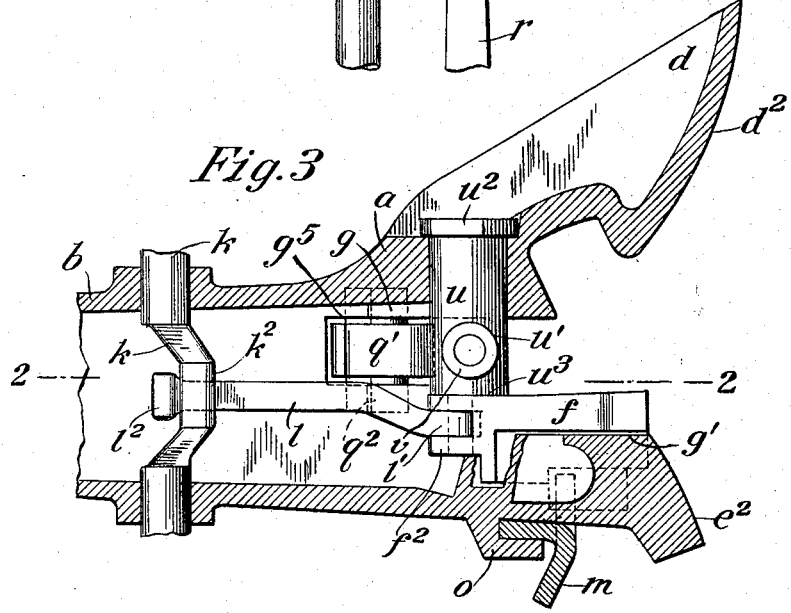

J. WILLISON.
AUTOMATIC CAR COUPLING.
APPLICATION FILED DEC. 31, 1913. RENEWED AUG. 10, 1916.
1,201,668.
Patented Oct. 17, 1916.
2 SHEETS—SHEET 2.
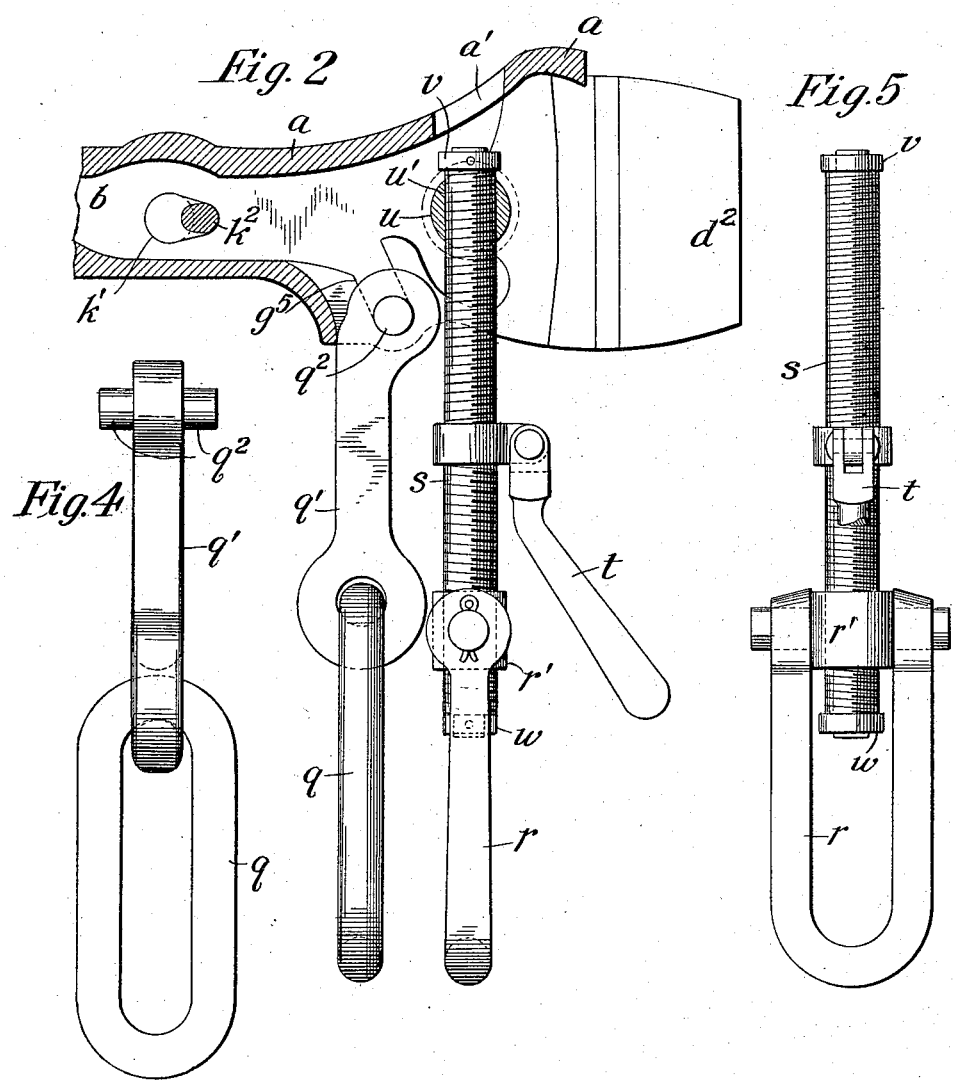

UNITED STATES PATENT OFFICE.

JOHN WILLISON, OF DERBY, ENGLAND, ASSIGNOR TO THE NATIONAL MALLEABLE CASTINGS COMPANY, OF CLEVELAND, OHIO.

AUTOMATIC CAR-COUPLING.

1,201,668.               Specification of Letters Patent.       Patented Oct. 17, 1916.

Application filed December 31, 1913, Serial No. 809,603.   Renewed August 10, 1916.   Serial No. 114,295.

*To all whom it may concern:*

Be it known that I, JOHN WILLISON, a subject of the King of Great Britain, and a resident of Derby, county of Derby, England, have invented new and useful Improvements in Automatic Car-Couplings, of which the following is a specification.

This invention relates to automatic car couplers of the kind described in my co-pending application, Serial No. 114,292, filed August 10, 1916, and it consists in improvements having for object to furnish such a coupler with a safety coupling chain and with a screw coupling device so that a car provided with the improved coupler may be coupled to cars that have ordinary draw hook couplings.

The invention will be explained with reference to the accompanying drawings, wherein it is shown, by way of example, as applied to the automatic coupler described in my co-pending application Serial No. 114,294, filed Aug. 10, 1916, which is an improvement on the coupler shown in the previously cited specification.

In the drawings, Figure 1 is an elevation of the improved coupler showing the safety coupling and the screw coupling device in the positions they occupy when not in use, Fig. 2 is a longitudinal section on line 2—2 of Fig. 3, Fig. 3 a sectional plan on line 3—3 of Fig. 1; Fig. 4 a front view of the safety coupling and Fig. 5 a similar view of the screw coupling device.

In the drawings the parts of the coupler head of the locking block and of the lock set device which are herein referred to and correspond to similar parts shown and described in the above cited specifications have the same reference characters applied to them as in those specifications and therefore need no further explanation now.

In the accompanying drawings, the safety coupling chain is shown as comprising a link $q$ carried by one end of an arm $q'$ which at its other end is provided with a pair of trunnions $q^2$ mounted to rock in open bearings $g^5$ formed on the side walls of the locking block recess $g$ of the coupler head $a$. The openings or mouths to the bearings $g^5$ are upwardly directed.

The screw coupling device comprises the shackle $r$ swiveled to the nut $r'$ coöperating with the screwed rod $s$, to which is attached the operating handle $t$ of suitable form. The rod $s$ is adapted for screwing through the threaded aperture $u'$ of a pin $u$ rotatably mounted in a side wall of the coupler head. The pin $u$ has an enlarged head $u^2$ and has a length such that the face $u^3$ of its inner end will when the pin is in proper position act as a guide to the locking block $f$ in its to and fro movements. The position of the aperture $u'$ is such that when the several parts of the coupling are assembled, with the end of the pin $u$ acting as a guide to the locking block and the pin head $u^2$ seated against the outer face of the wall of the coupler head, then the side of the screwed rod $s$, threaded through the aperture $u'$, will be in contact with the inner face of the said wall, or very nearly so. In this way, the pin cannot move in either direction longitudinally and is thus retained by the pin head and the screwed rod in proper working position.

In the top wall or roof of the recess in the coupler head is a hole $a'$ for use in the operation of assembling the parts of the coupler. The position of this hole is such that when the pin $u$ is turned for the purpose its aperture $u'$ can be brought into coaxial relation with the hole $a'$. The hole $a'$ is sufficiently large to allow the end of the screwed rod to pass through in order that a collar $v$ may be affixed to the end and the rod and collar then withdrawn within the coupler-head. The collar $v$ is for the purpose of preventing the corresponding end of rod $s$ being withdrawn through the aperture of pin $u$ in order that the screw coupling may remain suspended from the pin $u$. A similar collar $w$ is fixed to the other end of the rod $s$ in usual manner to prevent the rod being withdrawn completely through the nut $r'$ while the screw rod $s$ is being turned by means of the handle $t$ in order to slacken the coupling between two cars.

The operation of assembling the several parts of the automatic coupling and its accessories is effected as follows:—The trunnions $q^2$ of the safety coupling are first mounted in the bearings $g^5$. The pin $u$ having been passed through the side wall of the coupler head, the rod $s$ before or after the nut $r'$ with its shackle $r$ has been screwed on to its end, is then threaded through the aperture of the pin $u$ to such extent that its end, after the pin $u$ has been suitably turned for the purpose, projects through the aperture $a'$ in order that the collar $v$ may be fixed thereon. This done the rod with its collar is drawn within the coupler head to its full extent, that is until the collar $v$ engages the pin $u$.

The bearings $g^5$ are so shaped and formed that when the screw coupling device has been threaded through the pin $u$, will serve to prevent the withdrawal of the safety coupling from the bearings $g^5$.

The locking block $f$ together with the mechanism $k$, $l$ for operating same and the lock set device $m$ can now be mounted in operative position.

Having thus described the nature of my said invention and the best means I know of carrying the same into practical effect, I claim:—

1. In an automatic coupler of the vertical plane type comprising a coupler head having a gravity-actuated lock mounted in a cavity thereof for normal intercoupling operations, a screw coupling device mounted in said cavity and bearing against the lock, said device being comprised of a trunnion mounted in said cavity, a rod having a threaded engagement with said trunnion and with a connection for a coupling link, the said screw coupling device hanging normally below the coupler head.

2. In a car coupler of the vertical plane type, a coupler head having a cavity therein, a gravity-actuated lock mounted in said cavity, and a screw coupling device mounted on a trunnion in said cavity, the said screw coupling device being adapted to depend from said trunnion vertically when in operative position and to be rotated about said trunnion into horizontal position for connection with an opposing car.

3. In a car coupler of the vertical plane type, a coupler head having a cavity therein, a gravity-actuated locking block operating in said cavity, and a screw coupling device mounted on a trunnion in said cavity and comprising a threaded rod having a threaded engagement with said trunnion and with a connection for a coupling chain, a recess in said cavity for reception of a link of a supplemental chain, the said screw coupling device and supplemental chain being adapted to hang loosely from the coupler head when in inoperative position.

JOHN WILLISON.

Witnesses:
JOSEPH MILLARD,
W. I. SKERTEN.

Copies of this patent may be obtained for five cents each, by addressing the "Commissioner of Patents, Washington, D. C."